(12) United States Patent
Schütterle et al.

(10) Patent No.: US 8,740,226 B2
(45) Date of Patent: Jun. 3, 2014

(54) SYSTEM FOR CONTACTLESSLY SEALING A ROTABLY MOUNTED SHAFT FROM A HOUSING, AND GEAR UNIT

(75) Inventors: Ingo Schütterle, Sigmaringen (DE); Andreas Heβ, Bietigheim (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 54 days.

(21) Appl. No.: 13/581,438

(22) PCT Filed: Jan. 28, 2011

(86) PCT No.: PCT/EP2011/000379
§ 371 (c)(1),
(2), (4) Date: Aug. 27, 2012

(87) PCT Pub. No.: WO2011/107191
PCT Pub. Date: Sep. 9, 2011

(65) Prior Publication Data
US 2012/0319356 A1   Dec. 20, 2012

(30) Foreign Application Priority Data

Mar. 3, 2010  (DE) .................... 10 2010 010 240

(51) Int. Cl.
*F16J 15/32*   (2006.01)

(52) U.S. Cl.
USPC ............ 277/420; 277/419; 277/418; 277/412

(58) Field of Classification Search
USPC ......... 277/346, 347, 409, 411, 412, 418, 419, 277/420
See application file for complete search history.

(56) References Cited

U.S. PATENT DOCUMENTS

| | | | |
|---|---|---|---|
| 2,598,381 A | | 5/1952 | Hoffman |
| 3,971,565 A | * | 7/1976 | Schickling et al. ........... 277/551 |
| 4,157,834 A | | 6/1979 | Burdette |
| 4,410,187 A | * | 10/1983 | Legoy et al. .................. 277/347 |
| 5,498,006 A | * | 3/1996 | Orlowski ...................... 277/419 |
| 5,538,258 A | | 7/1996 | Hager et al. |
| 5,833,372 A | * | 11/1998 | Nisley ........................... 384/477 |
| 5,996,542 A | | 12/1999 | Bathurst |

(Continued)

FOREIGN PATENT DOCUMENTS

| DE | 470 121 | 1/1929 |
|---|---|---|
| DE | 479 388 | 7/1929 |

(Continued)

OTHER PUBLICATIONS

International Search Report, issued in corresponding International Application No. PCT/EP2011/000379.

(Continued)

*Primary Examiner* — Gilbert Lee
(74) *Attorney, Agent, or Firm* — Kenyon & Kenyon LLP

(57) ABSTRACT

In a system for contactlessly sealing a rotably mounted shaft from a housing, and a gear unit, oil is provided in the interior of the housing, the rotating shaft in particular projecting from the interior to the outer area, wherein a centrifugal disk is provided, which is connected to the shaft in torsionally fixed manner and has at least partially radially extending bores, which connect oil from a centrifugal chamber to a catch basin surrounding the centrifugal disk.

17 Claims, 4 Drawing Sheets

(56) References Cited

U.S. PATENT DOCUMENTS

| | | | | |
|---|---|---|---|---|
| 6,155,574 | A | * | 12/2000 | Borgstrom et al. ............ 277/419 |
| 6,629,816 | B2 | | 10/2003 | Langston et al. |
| 6,843,482 | B1 | * | 1/2005 | Bayne ........................... 277/412 |
| 2007/0164516 | A1 | * | 7/2007 | Olsen et al. ................... 277/347 |
| 2010/0102514 | A1 | | 4/2010 | Lipot |
| 2012/0000308 | A1 | | 1/2012 | Schuetterle et al. |

FOREIGN PATENT DOCUMENTS

| | | |
|---|---|---|
| DE | 33 30 473 | 5/1984 |
| DE | 35 44 783 | 6/1987 |
| DE | 39 30 280 | 3/1991 |
| DE | 42 20 754 | 1/1994 |
| DE | 698 18 914 | 8/2004 |
| DE | 11 2004 000 627 | 3/2006 |
| DE | 10 2005 059 847 | 2/2007 |
| DE | 602 16 474 | 9/2007 |
| DE | 601 30 871 | 7/2008 |
| DE | 10 2007 014 657 | 10/2008 |
| EP | 1 260 724 | 11/2002 |
| GB | 2 236 813 | 4/1991 |
| WO | 99/49246 | 9/1999 |
| WO | 2010/099914 | 9/2010 |

OTHER PUBLICATIONS

International Preliminary Report on Patentability and Written Opinion, issued in corresponding International Application No. PCT/EP2011/000379.

* cited by examiner

SYSTEM FOR CONTACTLESSLY SEALING A ROTABLY MOUNTED SHAFT FROM A HOUSING, AND GEAR UNIT

FIELD OF THE INVENTION

The present invention relates to a system for contactlessly sealing a rotably mounted shaft from a housing, and to a gear unit.

BACKGROUND INFORMATION

In sealing systems which include radial shaft sealing rings, it is conventional that the friction losses increase with rising rotational speed.

German Published Patent Application No. 602 16 474 describes contactless sealing, in which a centrifugal disk is provided on a shaft, which disk has radial bores as centrifugal openings (FIG. 1, reference numeral 44). The radial bores allow the escape of lubricating oil that has collected in a centrifugal chamber lying radially on the inside, and the bores then eject the oil into a catch basin at their other end region. The centrifugal disk has an axial gap with respect to a non-rotating part, which gap connects the centrifugal chamber to the catch basin.

A labyrinth seal is described in German Published Patent Application 479 388.

U.S. Pat. No. 2,598,381 describes the connection of an inner chamber, partially filled with lubricating oil, of a gear unit to the outside air via an air channel (FIG. 1, reference numeral 9), e.g., for pressure compensation purposes. In this case, the centrifugal force moves the oil radially and axially toward the inside in that a corresponding chamfer is provided. Independently of this air channel, contactless sealing is obtained by a centrifugal edge, which during a rotary motion flings the oil into a catch basin (FIG. 1, reference numeral 13), which is connected to the oil sink chamber via a downwardly extending bore.

German Published Patent Application No. 10 2007 014 657 describes a radial shaft sealing device in which ejected oil is likewise recirculated.

A radial shaft sealing system for which a shaft sealing ring is provided is described in German Published Patent Application No. 698 18 914.

German Published Patent Application No 601 30 871 describes a sealing ring for a water pump bearing.

In addition, a sealing system operating in contactless manner during a rotary motion of the shaft of a gear unit, in which ejected fuel is likewise recirculated is described in German Published Patent Application No. 42 20 754.

Such a sealing system which operates in contactless manner during a rotary motion of the shaft is also described in German Published Patent Application No. 39 30 280.

A sealing system operating while making contact is described in German Published Patent Application No. 35 44 783.

A sealing system operating in contactless manner during a rotary motion of the shaft, in which ejected fuel is recirculated, is also described in German Published Patent Application No. 33 30 473.

A sealing system operating in contactless manner during a rotary motion of the shaft, which features a recirculation of oil ejected from a multitude of shaft grooves, is described in German Published Patent Application No. 11 2004 000 627 as well.

Described in German Published Patent Application No. 470 121, is a sealing system operating in contactless manner during a rotary motion of the shaft, in which oil ejected from sharp edges is also recirculated.

U.S. Pat. No. 5,538,258 describes a contactless seal, in which a centrifugal disk which has radial bores as centrifugal openings (FIG. 1, reference numeral 44 there), is provided on a shaft. The radial bores allow the drainage of lubricating oil which has collected in a centrifugal chamber lying radially on the inside, and the bores then spray the oil into a catch basin at their other end region. The centrifugal disk has an axial gap towards a non-rotating part, which gap connects the centrifugal chamber to the catch basin.

SUMMARY

Example embodiments of the present invention provide for reducing the servicing requirement and reducing losses in a sealing system.

Among features of example embodiments of the present invention in the system are that they are provided for contactlessly sealing a rotably mounted shaft from a housing, oil being provided in the interior of the housing, the rotating shaft projecting from the interior to the exterior region, for example, wherein a centrifugal disk is provided, which is connected to the shaft in torsionally fixed manner and has at least partially radially extending bores which connect oil from a centrifugal chamber to a catch basin surrounding the centrifugal disk.

Therefore, a centrifugal disk connected to the shaft in torsionally fixed manner is provided with at least partially radially extending bores, so that lubricating oil is able to be conveyed from a centrifugal chamber into a catch basin surrounding the centrifugal disk, the bores discharging into the centrifugal chamber via their end region lying radially on the inside, and discharging into the catch basin via end regions lying radially on the outside, a gap region being provided between the centrifugal disk and a flange part of the housing, which connects the centrifugal chamber to the catch basin, and into which a bore discharges via its first end region, which bore discharges into a further catch basin area via its other end region, so that lubricating oil flung into the further catch basin area from the centrifugal edge connected to the shaft in torsionally fixed manner is able to be caught and conveyed to the gap region through the bore, a gap region connecting the further catch basin area to the centrifugal chamber, and a dust guard which is sealed from the flange part by a labyrinth seal being disposed on the shaft.

The bore between the gap region and the further catch basin region preferably extends axially.

An advantage of the arrangements described herein is that oil from a centrifugal chamber, which at least partially surrounds the centrifugal disk and is delimited by the housing elements and shaft or a centrifugal bushing provided on the shaft, is able to be removed through the centrifugal disk, i.e., through bores in the centrifugal disk. This makes it possible to effectively evacuate the centrifugal chamber. In so doing, the evacuation does not take place into the oil sink region or into the interior, such as the interior of the gear unit, but into a catch basin, i.e., a physical area which is delimited by flange parts and the rotating component, i.e., the shaft or a centrifugal bushing provided on the shaft.

Wear of the seal is therefore avoidable, especially when compared to shaft sealing rings exposed to wear. Furthermore, the service requirement is improved and the reliability is better as well.

Moreover, it is advantageous that oil caught in a catch basin which is situated further on the outside in the axial direction is able to be guided into the gap region between the centrifugal disk rotating along, and the stationary flange part. Since this gap region extends in the radial direction, there exists a pressure gradient between centrifugal chamber and catch basin, which has a conveying effect, which acts as recirculation. That is to say, even if oil did manage to make its way past the centrifugal disk further toward the outside in the axial direction, a post-connected catch basin would make it possible to recirculate the oil through the bore between the gap region and the catch basin area.

An advantage hereof is that an active pumping effect is achievable in a contactless seal.

The dust guard may be connected to the shaft with form locking, in particular by radially oriented connecting screws, or it is frictionally connected to the shaft. This has the advantage that the dust guard is fixed in place on the shaft in a manner allowing it to rotate along. The dust guard covers the gap between the shaft and flange part, so that no contamination is able to enter at this location.

The dust guard may be arranged in the shape of a pineapple and may have a labyrinth on its side facing the flange part. This has the advantage of allowing contactless and thus wear-free sealing in an uncomplicated manner.

The centrifugal disk may be mounted on a centrifugal bushing provided on the shaft. This has the advantage that the installation is uncomplicated and, furthermore, diameter deviations such as an axial region having a decreasing or increasing diameter, are able to be produced in a simple and cost-effective manner. The reason for this is that the centrifugal bushing does not conduct any substantial torque, although the centrifugal disk is fixed in place on the centrifugal bushing. It is therefore possible to provide centrifugal grooves on the centrifugal bushing in a simple and cost-effective manner.

The centrifugal chamber may be at least partially delimited by a channel which extends around the centrifugal disk and is arranged as a local maximum of the radial distance of the surface of the centrifugal disk, it thus being the case, in particular, that the radial distance of adjacent surface regions of the centrifugal disk increases with decreasing axial distance from the channel. This has the advantage that oil driven by the centrifugal force is forced into this channel and is then carried away from there by the bores.

The outer diameter of the centrifugal bushing may increase in the direction of the centrifugal disk, at least in an axial subregion, in particular by a chamfer provided on the centrifugal bushing, especially such that oil is carried in the direction of the centrifugal disk, in particular in the direction of the channel of the centrifugal disk. This has the advantage or producing a conveying effect in the direction of the channel and thus via the connected bore in the centrifugal disk, so that an evacuation of the oil into the catch basin is able to take place, especially in an uncomplicated manner.

A gap region, especially a radially extending gap region, may be provided between the centrifugal disk and a flange part of the housing, into which a bore discharges, which is connected to a catch groove, that is to say, a catch basin area provided in the flange part, the bore in particular being disposed at a smaller radial distance than the radial distance of the end region of the gap region discharging into the catch basin, the catch groove in particular being provided axially further on the outside than the centrifugal disk. This has the advantage that a pumping effect is achievable in the gap region, because the gap region is delimited by the centrifugal disk on a first side area, and on the side surface lying opposite this first side surface, it is delimited by the housing part that is not rotating along, that is to say, the outer flange part, in particular. As a result, vacuum pressure for evacuating the discharging bore in the direction of the catch basin connected at a greater radial distance comes about.

A gap may be provided between the centrifugal bushing and a further flange part connected to the flange part, which gap is implemented as radial gap in a first subregion and as axial gap in a further subregion. This has the advantage that oil must cross the radial gap from the outside to the inside, since the end region of the radial gap is situated at a greater radial distance from the interior and the end region of the radial gap having a smaller radial distance must first be reached counter to the centrifugal force.

The gap may discharge into a catch groove which is provided in the further flange part and is connected to the catch basin via another gap situated between the further flange part and the centrifugal bushing. This has the advantage that the gap constitutes another barrier for penetrating oil. It is implementable as capillary gap, in particular, and for this reason as well, constitutes a barrier that is very difficult to overcome.

The lower region of the catch basis may be connected via a bore to the interior of the housing, especially the oil sink region. This has the advantage that oil caught in the catch basin, or oil that has penetrated the catch basin is able to be driven toward the oil sink, especially under the influence of the gravitational force.

The flange parts may be screw-fitted and a seal, especially an O-ring seal, may be arranged between them. This has the advantage that the housing is able to be produced as tight and stable housing. Especially the connecting point of the two flange parts is sealed, so that the O-ring seal lies farther on the inside in the connecting area, and the screwed connection farther toward the outside. As a result, no oil from the interior travels via the connecting area, i.e., contact surface, to the threaded region of the screw, and from there, to the outer area. FIG. 1 shows a screw which extends from the outer region through the outer and inner flange part. In exemplary embodiments, the screw does indeed penetrate the outer flange part, but it is screwed into a non-continuous bore in the inner flange part.

A first impact region having a first drain channel may be arranged on the further flange part, it being the case, for example, that a second impact region having a second drain channel is situated on the further flange part, the impact region and the drain channel especially being implemented in rotationally symmetric manner. This has the advantage that each impact region is able to be provided in combination with a corresponding drain channel, thereby allowing the simple and rapid discharging of the impinging fluid particles. As a result, the main quantity of the oil sprayed around above the oil level during operation is able to be caught and recycled, especially at the outer circumference of the overall sealing system.

A centrifugal groove may be arranged on the centrifugal bushing radially opposite the catch groove(s). This has the advantage that the centrifugal groove may be manufactured in a simple and cost-effective manner.

The gap regions may be implemented as capillary gap regions. This has the advantage that the flow resistance for oil is very high, so that at least its rapid flow through the gap is hampered.

A dust guard, which is in contact with the flange part, may be arranged on the shaft. This has the advantage that the method of functioning of the viewing system is not interfered with. If large quantities of dust were to penetrate, this could cause clogging of a bore, for example. The space protected by the dust guard is connectable, either directly or by a gap, to a catch groove or some other catch basin region, such as the catch basin.

The dust guard plays no part in the actual sealing effect in the sealing system. It protects merely from penetrating dust and touches the flange part that is part of the housing at its outer surface.

The oil level may be below the system when the gear unit is idle, i.e., it lies below in the gravitation direction. This has the advantage that in the idle state, there is no chance that oil will flow through the sealing system and then make it way to the outer region.

Further features and aspects of example embodiments of the present invention are described in more detail below with reference to the appended Figures.

DETAILED DESCRIPTION

Figure 1:
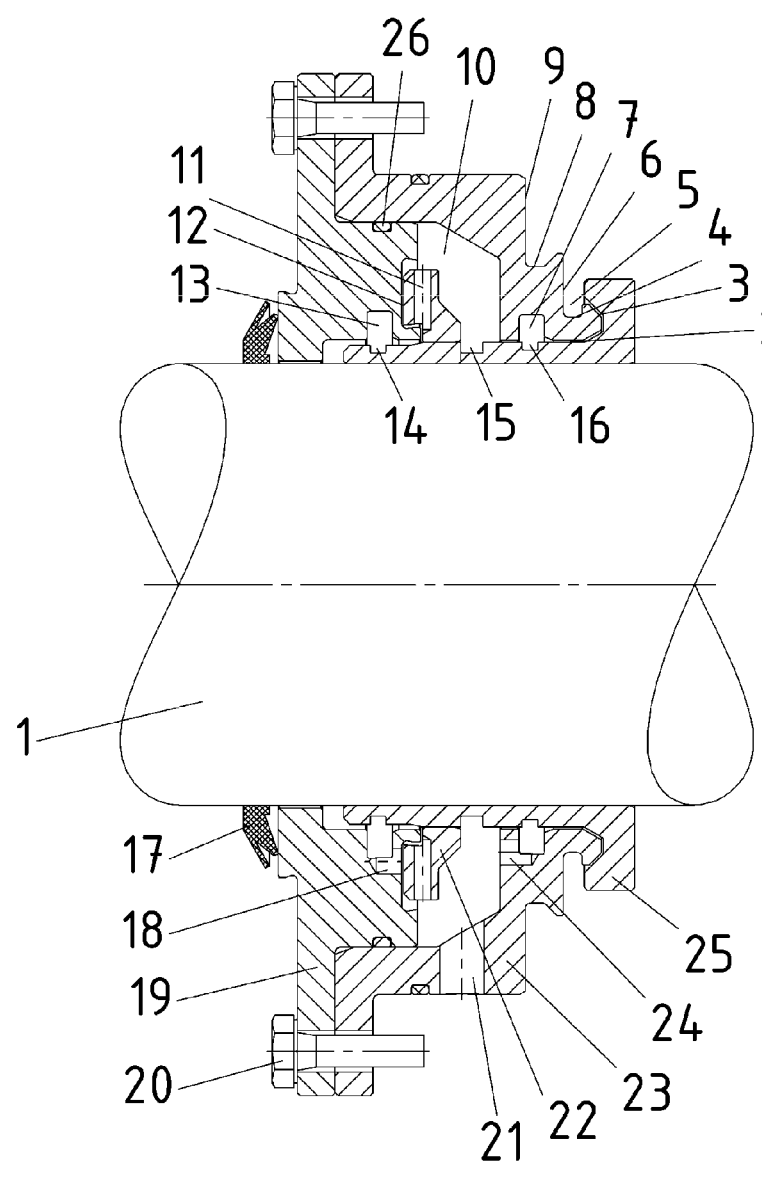
FIG. 1 schematically illustrates a system according to an example embodiment of the present invention.
Figure 2:
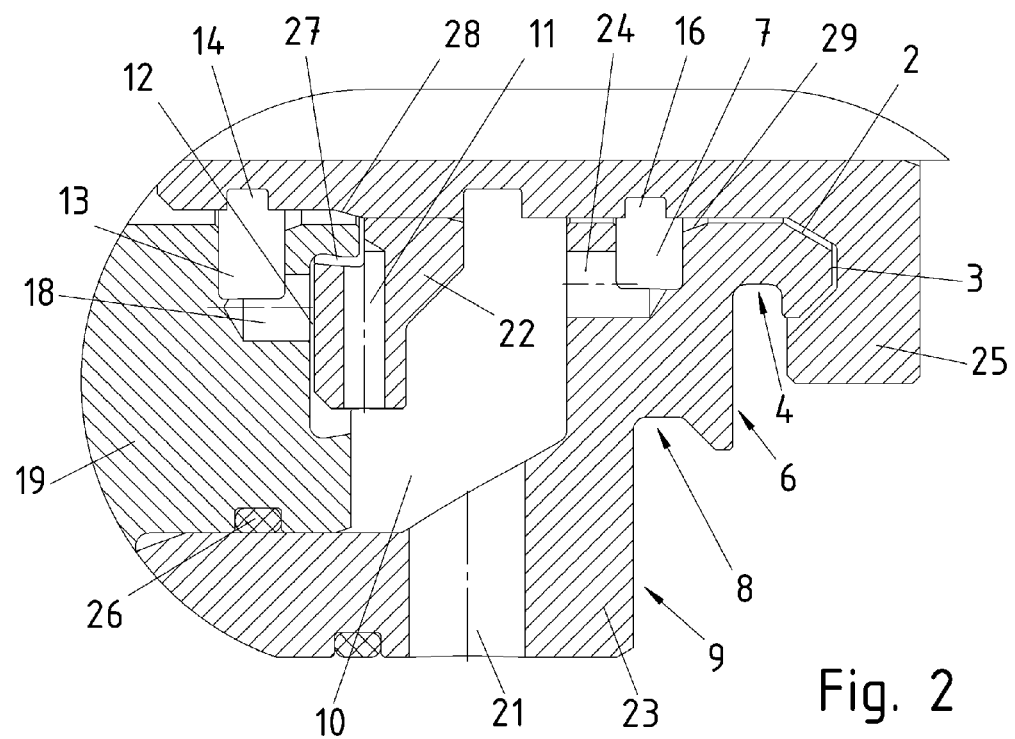
FIG. 2 shows an enlarged cutaway view.

FIG. 1 schematically illustrates a system according to an example embodiment of the present invention. FIG. 2 shows an enlarged cutaway view.

Figure 3:
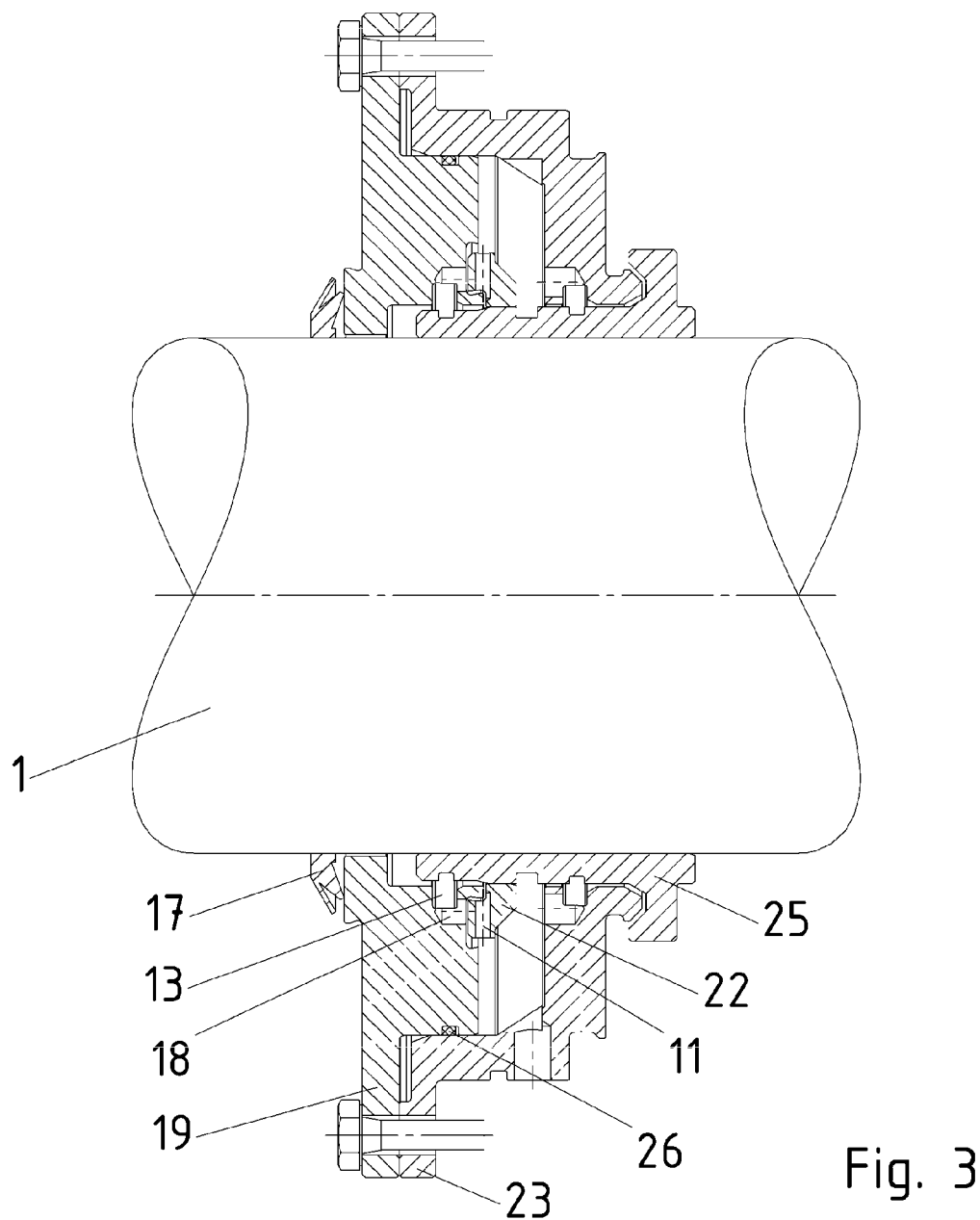
FIG. 3 shows a cross-sectional view which illustrates a dust guard, which touches flange part.

FIG. 3 shows a cross-sectional view which also clearly shows dust guard 17, which touches flange part 19.

Figure 4:
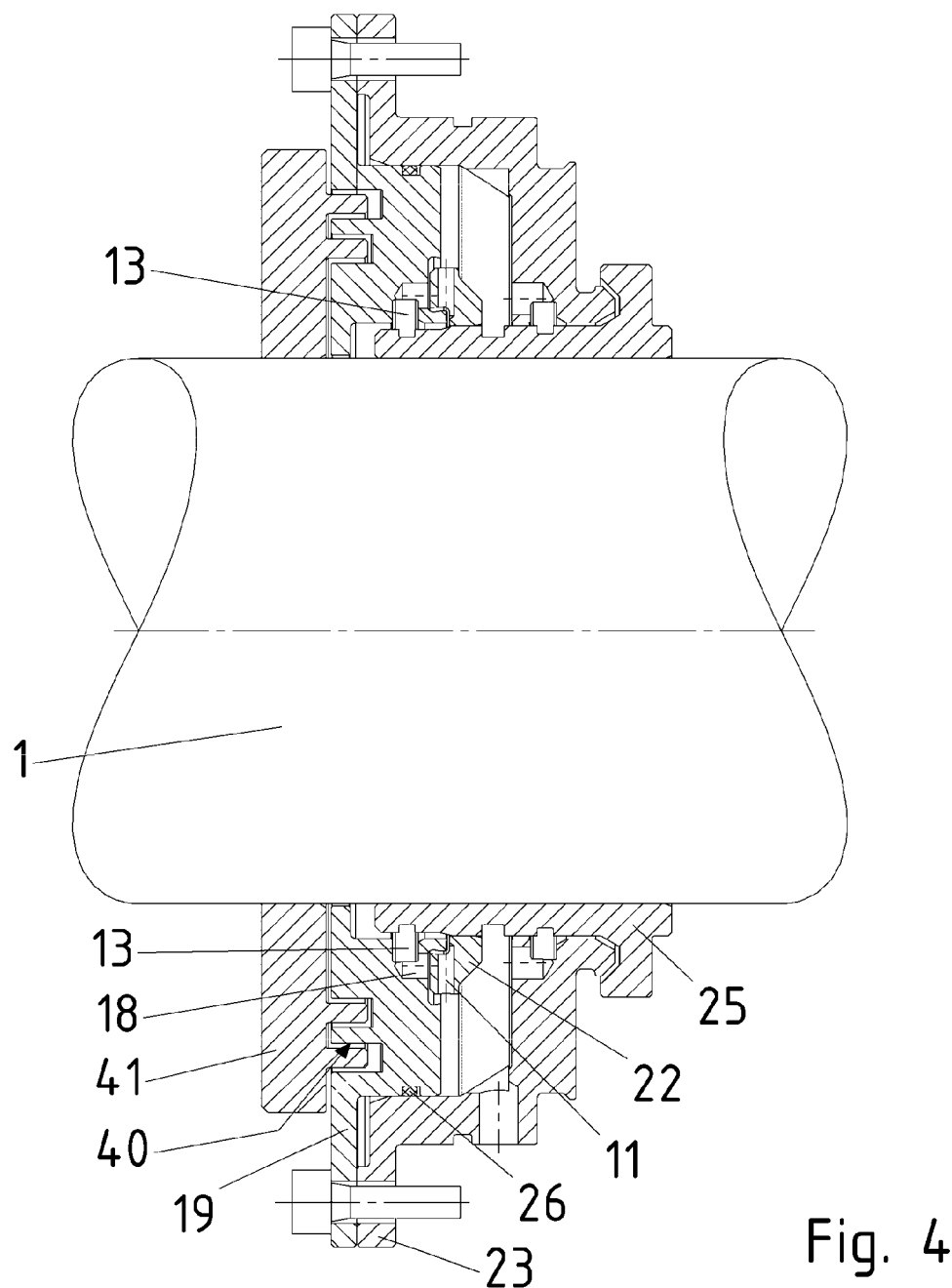
FIG. 4 illustrates an arrangement, in which the dust guard is sealed from flange part in contactless manner.

FIG. 4 shows another arrangement, in which the dust guard is sealed from flange part 19 in contactless manner.

In example embodiments of the present invention, contactless sealing between a rotating shaft 1 and a housing is obtained.

In this case, a centrifugal bushing 25 is situated on shaft 1, on which a centrifugal disk 22 is disposed in addition, in particular using an integral or press-fit connection.

An outer sealing flange 19 and an inner sealing flange 23 are provided on the housing, the centrifugal disk being set apart from outer sealing flange 19 by a gap 12, and centrifugal bushing 25 being set apart from inner sealing flange 23 via a gap, including entry labyrinth 3 and axial gap 2.

The sealing system has a multi-stage configuration, so that oil making its way through each hurdle must overcome an additional hurdle in each case.

The entire sealing system is situated above the particular oil level that comes about when shaft 1 is idle. When shaft 1 is in operation, it is possible that oil foam or oil spray is produced, for instance by toothed wheels which are in direct or indirect connection with the shaft. This oil level is preferably situated underneath recirculation bore 2.

The oil striking impingement surface 9 is shunted away via an annular discharge channel 8 and routed in the downward direction toward the oil sink.

Provided axially farther on the inside, but radially lower is impingement surface 8, which is delimited radially on the inside by an annular attenuation chamber 5, which has a discharge channel 4 radially on the inside. At the beginning, entry labyrinth 3, which is provided between centrifugal bushing 25 and inner sealing flange 23, has an orientation toward the inside in the axial direction, then transitions into a radially extending section and ends in the form of an axial gap 2 lying radially farther inside, this axial gap then extending in an outward direction in the axial direction, and widening in the direction of catch groove 7 in its end region. The widening, i.e., the widening denoted by reference numeral 29, is achieved by a corresponding chamfer, so that the capillary effect is interrupted in this region. Disposed on centrifugal bushing 25, opposite catch groove 7, is a centrifugal groove 16, which spins off oil in the direction of catch groove 7. Provided in the lower region of catch groove 7 is a discharge bore, which is oriented in the axial direction and leads to a catch basin 10, which routes oil back into the oil sink via another bore, i.e., outer return bore 21 in inner sealing flange 23.

A gap, which connects catch groove 7 to catch basin 10, is provided between centrifugal bushing 25 and inner sealing flange 23.

Another centrifugal groove 15 is situated in the axial region of catch basin 10, so that oil penetrating via the gap is spun off.

In addition, there is also a downstream centrifugal disk 22, which likewise spins off oil into catch basin 10.

Axially next to centrifugal disk 22 is another centrifugal groove 14, opposite which a catch groove 13 is situated on flange part 19. As a result, oil is flung off from the edges of centrifugal disk 14, into catch groove 13.

Centrifugal bushing 25 is implemented with a chamfer 28 such that its outer diameter increases in an axial region situated between centrifugal groove 14 and centrifugal disk 22, such that it increases with decreasing distance from centrifugal disk 22, so that possibly arriving oil is conveyed in this direction, i.e., toward centrifugal disk 22. In other words, chamfer 28 takes part in the recirculation.

The oil is then routed into centrifugal chamber 27, which is evacuated into catch basis 10 by centrifugal bores 11, which are introduced in centrifugal disk 22 in the radial direction. A plurality of such centrifugal bores 11, in particular between four and twenty, is provided along the periphery of the centrifugal disk.

Catch groove 13 which is situated radially farther toward the outside, has in its lower region, which includes the lowest point, in particular, an axially oriented bore 18 toward the gap region, i.e., gap 12, which is provided between centrifugal disk 22 and outer flange 19. Catch groove 13 is assigned a centrifugal groove 14, which is provided on centrifugal bushing 25.

This gap region of gap 12 is open in the direction of catch basin 10. Since bore 18 discharges into gap region 12 at a smaller radial distance than the radial distance of the radially outward end region of gap region 12, where gap region 12 discharges into catch basin 10, a conveying effect is present. For the rotary motion produces a vacuum pressure, which causes bore 18 to be pumped out and to catch groove 13 to be emptied as a result.

Therefore, it is not only the known spin-off that is provided for the evacuation, but also the pumping effect of a gap region 12.

Catch grooves 7 and 13 are thus emptied into catch basin 10 and not directly into the interior and/or the oil sink region. Bore 24 connects catch groove 7 to catch basin 10 for this reason.

Inner sealing flange 23 and outer sealing flange 19 are connected to each other, sealed by an O-ring seal 26, and a plurality of holding screws 20 which follow each other in the peripheral direction connect the two sealing flanges. As a result, a arrangement of the two sealing flanges 19 and 23 is also implementable in one piece. In addition, there is a dust guard 17 provided on the outside.

Another catch basin region, which is situated separately from catch basin 10 and provided axially farther outside, is formed by catch groove 13.

FIG. 4 shows another arrangement, in which the dust guard has contactless sealing from flange part 19. Dust guard 41 is implemented as labyrinth disk. The corresponding labyrinth is implemented in flange part 19, so that contactless sealing is provided, which prevents dust from penetrating.

This has the advantage that dust guard 41 is fixed in place on the shaft in a manner that allows it to rotate along. Dust guard 41, which is situated axially in front of flange part 19 and is set apart from it in the axial direction, covers the gap between shaft 1 and flange part 19 in the radial direction, so that no contamination is able to penetrate there. Labyrinth seal 40 is situated at a greater radial distance from the shaft axis than the gap between shaft 1 and flange part 19.

LIST OF REFERENCE NUMERALS

1 shaft
2 axial gap
3 entry labyrinth, including radially extending gap section
4 discharge channel
5 attenuation chamber
6 impingement surface
7 catch groove
8 discharge channel
9 impingement surface
10 catch basin
11 centrifugal bore
12 gap, in particular radial gap
13 catch groove, further catch basin region
14 third centrifugal groove
15 second centrifugal groove
16 centrifugal groove
17 dust guard
18 inner return bore
19 flange, outer sealing flange
20 holding screw
21 outer return bore
22 centrifugal disk
23 inner sealing flange
24 discharge bore
25 centrifugal bushing
26 O-ring seal
27 centrifugal chamber
28 chamfer
29 widening
40 labyrinth seal
41 dust guard

The invention claimed is:

1. A system for contactlessly sealing a rotably mounted shaft from a housing, an interior of the housing being at least partially fillable with lubricating oil, comprising:
 a centrifugal disk connected to the shaft in torsionally fixed manner and having bores that at least partially extend in a radial manner so that lubricating oil from a centrifugal chamber is conveyable into a catch basin at least partially surrounding the centrifugal disk, the bores adapted to discharge into the centrifugal chamber via end regions located radially on an inside, and to discharge into the catch basin via end regions located radially on an outside;
 a gap region arranged between the centrifugal disk and a flange part of the housing, the gap region connecting the centrifugal chamber to the catch basin, a bore adapted to discharge into the gap region, the gap region adapted to discharge into a further catch basin area via another end region, so that lubricating oil flung into the further catch basin area from a centrifugal edge connected to the shaft in torsionally fixed manner catchable and conveyable to the gap region through the bore;
 a gap region connecting the further catch basin area to the centrifugal chamber; and
 a dust guard sealed with respect to the flange part by a labyrinth seal and arranged on the shaft.

2. The system according to claim 1, wherein the dust guard is connected to the shaft with form locking, with form locking by radially oriented connecting screws, and/or with force-locking.

3. The system according to claim 1, wherein the dust guard is arranged in the form of a pineapple and has a labyrinth on a side facing the flange part.

4. The system according to claim 1, wherein the centrifugal disk is fixed in place on a centrifugal bushing provided on the shaft, which has centrifugal grooves.

5. The system according to claim 4, wherein an outer diameter of the centrifugal bushing increases in a direction of the centrifugal disk, at least in an axial subregion, by a chamfer provided on the centrifugal bushing such that oil is suppliable in a direction of the centrifugal disk and/or in a direction of a channel of the centrifugal disk.

6. The system according to claim 4, wherein each catch groove is assigned an individual centrifugal groove radially opposite on the centrifugal bushing.

7. The system according to claim 1, wherein the centrifugal chamber is at least partially delimited by an annular channel on a periphery of the centrifugal disk, and by the flange part of the housing, which is arranged as a local maximum of a radial distance of a surface of the centrifugal disk, a radial distance of adjacent surface regions of the centrifugal disk increasing with decreasing axial distance from the channel.

8. The system according to claim 1, wherein the gap region arranged as a radial gap, the further catch basin region being formed by a catch groove arranged in the flange part, the bore being arranged at a smaller radial distance from a shaft axis than a radial distance of the end region of the gap region that is adapted to discharge into the further catch basin region, the catch groove being provided axially farther outside than the centrifugal disk.

9. The system according to claim 1, wherein a lower region of the catch basin is connected to the interior of the housing and/or to an oil sink region via a bore.

10. The system according to claim 1, wherein the gap regions are arranged as capillary gap regions.

11. The system according to claim 1, wherein a widening is provided at an axial end region of a gap region arranged as a capillary gap, the widening adapted to interrupt a capillary effect in a region of the widening.

12. A system for contactlessly sealing a rotably mounted shaft from a housing, an interior of the housing being at least partially fillable with lubricating oil, comprising:
 a centrifugal disk connected to the shaft in torsionally fixed manner and having bores that at least partially extend in a radial manner so that lubricating oil from a centrifugal chamber is conveyable into a catch basin at least partially surrounding the centrifugal disk, the bores adapted to discharge into the centrifugal chamber via end regions located radially on an inside, and to discharge into the catch basin via end regions located radially on an outside;
 a gap region arranged between the centrifugal disk and a flange part of the housing, the gap region connecting the centrifugal chamber to the catch basin, a bore adapted to discharge into the gap region, the gap region adapted to discharge into a further catch basin area via another end region, so that lubricating oil flung into the further catch basin area from a centrifugal edge connected to the shaft in torsionally fixed manner catchable and conveyable to the gap region through the bore;

a gap region connecting the further catch basin area to the centrifugal chamber; and a dust guard sealed with respect to the flange part by a labyrinth seal and arranged on the shaft;

wherein the centrifugal disk is fixed in place on a centrifugal bushing provided on the shaft, which has centrifugal grooves; and wherein a gap is arranged between the centrifugal bushing and a further flange part connected to the flange part, the gap extending radially in a first subregion, and axially in a further subregion.

13. The system according to claim 12, wherein the gap is adapted to discharge into a catch groove, which is provided in the further flange part and connected to the catch basin via another gap arranged between the further flange part and the centrifugal bushing.

14. The system according to claim 12, wherein the flange part and the further flange part are screw-fitted, and a seal is disposed between the flange part and the further flange part.

15. The system according to claim 12, wherein a first impingement region having a first discharge channel is arranged on the further flange part, a second impingement region having a second discharge channel being arranged on the further flange part, the impingement regions and the discharge channel being arranged rotationally symmetric.

16. A gear unit, comprising:

the system as recited in claim 1;

wherein the gear unit is arranged such that if the gear unit is idle, an oil level lies below the system.

17. The gear unit according to claim 16, wherein the gear unit is arranged such that if the gear unit is idle, the oil level lies below, in a gravitational direction, below the system.

* * * * *